(12) United States Patent
Khan et al.

(10) Patent No.: US 12,088,481 B2
(45) Date of Patent: Sep. 10, 2024

(54) DYNAMIC HISTOGRAM BUILDER

(71) Applicant: Schweitzer Engineering Laboratories, Inc., Pullman, WA (US)

(72) Inventors: Md Arif Khan, Pullman, WA (US); Riley Grant Huddleston, Moscow, ID (US); Eric J. Hewitt, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 17/383,049

(22) Filed: Jul. 22, 2021

(65) Prior Publication Data

US 2023/0022715 A1 Jan. 26, 2023

(51) Int. Cl.
*H04L 43/045* (2022.01)
*G06F 3/04847* (2022.01)

(52) U.S. Cl.
CPC ........ *H04L 43/045* (2013.01); *G06F 3/04847* (2013.01)

(58) Field of Classification Search
CPC .......................... H04L 43/045; G06F 3/04847
See application file for complete search history.

(56) References Cited

U.S. PATENT DOCUMENTS

| | | | |
|---|---|---|---|
| 5,727,080 A | 3/1998 | Cox | |
| 8,880,368 B2 | 11/2014 | Hewitt | |
| 9,819,227 B2 | 11/2017 | Zweigle | |
| 9,985,860 B2 | 5/2018 | Zweigle | |
| 10,664,553 B2 | 5/2020 | Hewitt | |
| 11,152,916 B2 | 10/2021 | Halladay | |
| 2008/0130994 A1 | 6/2008 | Lin | |
| 2009/0136130 A1* | 5/2009 | Piper | G06F 16/00 382/170 |
| 2013/0326620 A1* | 12/2013 | Merza | H04L 63/1416 726/22 |
| 2017/0031565 A1* | 2/2017 | Chauhan | G06F 3/04847 |
| 2017/0272878 A1* | 9/2017 | Partio | H04R 3/04 |
| 2018/0024203 A1 | 1/2018 | Halladay | |
| 2019/0222524 A1* | 7/2019 | Naraki | H04L 67/61 |
| 2020/0379896 A1* | 12/2020 | Syamala | G06F 16/284 |
| 2021/0232580 A1* | 7/2021 | Pfeifer | G06F 16/2477 |

* cited by examiner

*Primary Examiner* — Jennifer N Welch
*Assistant Examiner* — Ashley M Fortino
(74) *Attorney, Agent, or Firm* — Fletcher Yoder, P.C.

(57) ABSTRACT

Systems, methods, and devices are provided for dynamically generating a histogram for viewing via a user interface. Embodiments presented herein provide apparatus and techniques for generating a histogram and adjusting a view of the histogram without the computations being perceived by a user. To do so, histogram indices may be computed for various time intervals (e.g., minutes, hours, days, etc.) of input data. The indices may be used to generate a histogram for a time interval that may be larger than the interval used to compute the histogram indices. At the time period for the histogram displayed via the user interface is changed by the user, a dynamic histogram builder computes an adjusted histogram using histogram indices for the updated and/or changed time period. Embodiments herein provide techniques which reduce the time to compute the histogram and consume less computing resources to do so.

20 Claims, 8 Drawing Sheets

DYNAMIC HISTOGRAM BUILDER

BACKGROUND

This disclosure relates to dynamically presenting data via a user interface and, more specifically, to dynamically computing and presenting data using histograms.

Histograms are a useful visualization tool to quickly view a large amount of data. To generate a histogram, the data may be separated into intervals (e.g., bins). An amplitude of each bin may be obtained by counting a number of values in each bin. However, the histogram calculation may be time-consuming and resource-intensive depending on a size of the original data set. The time and complexity for computing a histogram increases as a size of the original data set increases. To change a view of the histogram or change the time frame for which the histogram is calculated results in redistributing the data within a number of bins and recomputing a number of values in each bin. Thus, for each change in the view of the histogram, one or more calculations are performed which can increase the time to compute and display a histogram. This may result in a less-than-desirable user experience.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

In addition, several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Thus, embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

Histograms may be used to provide a visual representation of a distribution of numerical data. To generate a histogram, a range of the numerical data (e.g., from a minimum numerical value to a maximum numerical value) may be divided into a number of "bins" (e.g., "buckets"). That is, a width of each bin may represent a portion of the range of the numerical data. Each bin may have a respective minimum and maximum value. The respective minimum and maximum values of a particular bin may be consecutive with a maximum and minimum of adjacent bins. That is, the ranges for the bins (e.g., between the respective minimum and maximum values) are consecutive, but non-overlapping.

An amplitude (e.g., height) of a particular bin may represent a frequency of data within the range of values (e.g., between the minimum and maximum) for that bin. That is, the amplitude of a particular bin may correspond to a number of occurrences (e.g., a count) of data within the range of that bin or a proportion of the input data having a value within the range of that bin. While histograms are beneficial for viewing a distribution (e.g., frequency) of a data value (or range of data), computing a histogram for a large data set is time consuming and resource intensive. For example, if a data sample is taken every 30 seconds for one year (e.g., 365 days), the resulting data set may have more than 946 million data points. While computing a histogram for this data is possible, it would not be practical. Moreover, if particular data points (e.g., a subset of data) in the data set used to compute the histogram change over time, the complexity and resources required to compute (or recompute) each histogram would increase with each iteration. Further, it may not be feasible to host and/or transmit the raw data and/or data corresponding to the histogram via a network, such as a personal area network (PAN), such as Bluetooth or ZigBee, a local area network (LAN) or wireless local area network (WLAN), such as an 802.11x Wi-Fi network, and/or a wide area network (WAN), (e.g., third-generation (3G) cellular, fourth-generation (4G) cellular, universal mobile telecommunication system (UMTS), long term evolution (LTE), long term evolution license assisted access (LTE-LAA), fifth-generation (5G) cellular, and/or 5G New Radio (5G NR) cellular).

Embodiments presented herein provide apparatus and techniques to enable dynamically building a histogram for a large data set and/or in near real-time and corresponding histogram data that can be transferred via a network. For example, embodiments, herein provide techniques to generate histogram indices for an input data set. In some embodiments, the histogram indices may correspond to a particular subset of the input data set for a particular range of the input data (e.g., for a particular time period). In some embodiments, the histogram indices may correspond to a histogram for a particular range of the input data.

Figure 1:
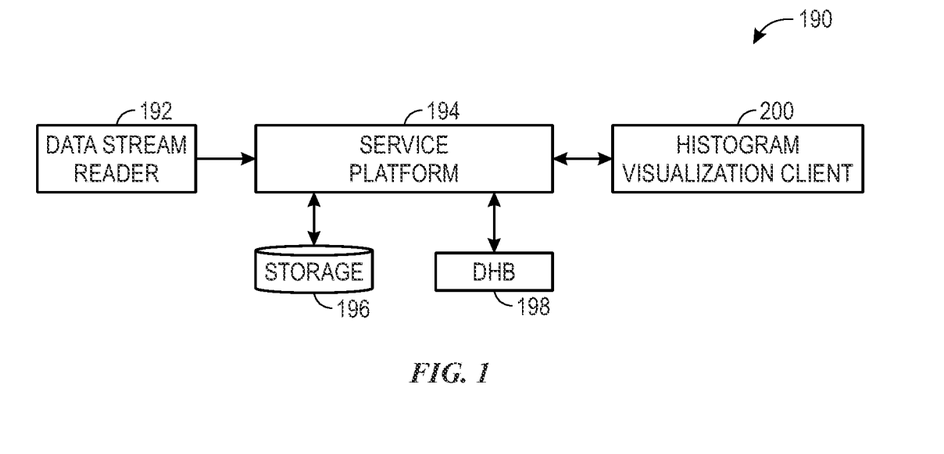
FIG. 1 is a simplified block diagram of a system for building a histogram from a stream of input data, in accordance with an embodiment of the present disclosure.

FIG. 1 is a simplified block diagram of a system 190 for building a histogram from a stream of input data, in accordance with an embodiment of the present disclosure. As illustrated, the system 190 includes a data stream reader 192, a service platform 194 and a histogram visualization client 200. The data stream reader 192 may provide a communication interface for the system 190. For example, the data stream reader 192 may receive an input data stream from one or more data sensors. The data sensors may monitor and obtain data associated with the system 190. The data (e.g., data stream) may correspond to data values sampled over time.

As an example, the data stream reader may obtain data values over time from a sensor associated with a power system. The data values may relate to a state of the power system, an operation state of a device coupled to the system, device conditions (e.g., a temperature, voltage, power consumption, etc.), environmental conditions (e.g., an ambient temperature, weather, humidity, air pressure, air quality, ambient noise level, brightness of light, etc.), health or safety conditions (e.g., air quality, noise level, etc.). An operation state of the system or a device may include in-operation, standby, off, testing, and the like. Device conditions may include a temperature, a voltage, a power consumption of the device, and the like. Environmental and health or safety conditions may include an ambient temperature, weather, humidity, air pressure, air quality, noise level, brightness of light, and the like. It should be understood that the system and data values discussed herein are merely examples and that the techniques and apparatus presented herein may be used to generate a histogram for any data set collected over time.

The service platform 194 receives the data stream from the data stream reader 192. As illustrated, the service platform 194 may be coupled to storage 196 and a dynamic histogram builder 198. The service platform 194 may store the data stream in the storage 196. In some embodiments, the dynamic histogram builder 198 may be coupled to the storage 196. The dynamic histogram builder 198 may process the data stream to identify one or more subsets of the data stream corresponding to one or more subsets of a total time period of the data stream. That is, the dynamic histogram builder 198 may subdivide the total time of the data stream into time periods shorter than the total time of the data stream. In some embodiments, a length of each time period may be the same, such as one minute, one hour, one day, etc. Thus, the dynamic histogram builder 198 may subdivide the data stream into subsets of data corresponding to each time period.

In some embodiments, the dynamic histogram builder 198 may calculate a histogram index for the data subset of each time period. Each histogram index may correspond to a histogram associated with a subset of the input data stream for each time period. That is, the dynamic histogram builder 198 may generate a number of histograms (e.g., histogram indices) for the input data stream. The dynamic histogram builder 198 may store the histogram indices in the storage 196. In some embodiments, the dynamic histogram builder 198 generates a histogram index for each time period and corresponding subset of data. That is, the dynamic histogram builder 198 may generate a histogram index for the data stream subdivided by multiple time periods. For example, the dynamic histogram builder 198 may generate a histogram index for the data stream subdivided in one minute intervals, one hour intervals, and one day intervals. In some embodiments, histogram indices for larger time intervals (e.g., days) may be computed using histogram indices for shorter time intervals (e.g., minutes). Doing so may reduce an amount of data processed to compute the histogram indices and thus may reduce a time and computing resources used to generate the histogram indices.

The various intervals for the histogram indices for a particular time interval (e.g., one day) may overlap. For example, using a day interval, a time period for a first histogram index may overlap another a second histogram index by one or more hours, such as 2 hours, 6 hours, 8 hours, 12 hours, 18, hours, or 20 hours. Similarly, using a one minute interval, a first histogram index may overlap a second histogram index by at least one or more seconds, such as 2 second, 5 seconds, 15 seconds, 30 seconds, or 40 seconds. As new (e.g., near real-time) data is received via the data stream reader 192, the dynamic histogram builder 198 may continuously compute additional histogram indices for the existing data stream in the storage and the new data. That is, the histogram indices in the storage 196 may be updated to include indices for the near real-time input data.

The histogram visualization client 200 is coupled to the service platform 194 and may be used to display a histogram for viewing via a user interface. The user interface may be disposed or executing on a target device remote from the system 190. The target device may include an electronic device such as a desktop computer, a laptop computer, a tablet, a smartphone, and the like. As an example, the histogram visualization client 200 may provide histogram data to the target device such that a histogram corresponding to the data can be displayed via a display of the target device.

In some embodiments, the histogram visualization client 200 may be remote from the service platform 194 and may communicate with the service platform 194 via a network. In some embodiments, the histogram visualization client 200 may be coupled to and communicate with a user device on which the histogram is to be displayed. In that case, the histogram visualization client 200 may be remote from the user device and communicate with the user device via a network. The histogram visualization client 200 may receive or obtain a time period of the histogram to be display thereon and/or a time interval (e.g., minute, hour, day, etc.) for each bin of the histogram to be displayed. The time interval for each bin may correspond to a size of the bins of the histogram to be displayed. In some embodiments, the histogram visualization client 200 may also receive or obtain (e.g., via the user device) a number of bins to be displayed in the histogram. The histogram visualization client 200 may provide the time period and bin size (e.g., interval) for the histogram to the service platform 194. The service platform 194 may retrieve one or more histogram indices from the storage 196 according to the specified time period and/or time interval.

The histogram visualization client 200 may receive an updated or adjusted time period for the histogram to be displayed. For example, the time period for the histogram may be shifted up or down (e.g., in a left or right direction on the user interface). Similarly, a length of the time period may be reduced or increased (e.g., by zooming in or out on the histogram via the user interface). In that case, the service platform 194 may obtain histogram indices for the updated or adjusted time period. That is, the service platform 194 may obtain one or more different indices (e.g., if the time period is shifted up or down) or additional indices (e.g., if the length of the time period is increased) compared to the indices used to display the previous histogram via the user interface. The different indices may include indices for a different time interval (e.g., minute, hour, day) or may correspond to a different time period of the input data stream. If the length of the previous time period is reduced (e.g., by zooming in on the histogram), the service platform 194 may obtain the indices for the smaller time period or may re-use the previously obtained indices without obtaining the indices again.

Advantageously, the dynamic histogram builder 198 may generate histogram indices that can be retrieved for a dynamically changing time period for the histogram. That is, the dynamic histogram builder 198 enables the histogram displayed via the user interface to be dynamically adjusted and/or changed based on user input (e.g., a time period for the histogram displayed via the user interface) using the histogram indices without the system 190 from having to calculate a histogram based on the input stream and input from the histogram visualization client 200. In some embodiments, the change or update of the histogram indices used to generate the histogram may not be perceivable to the user.

Figure 2:
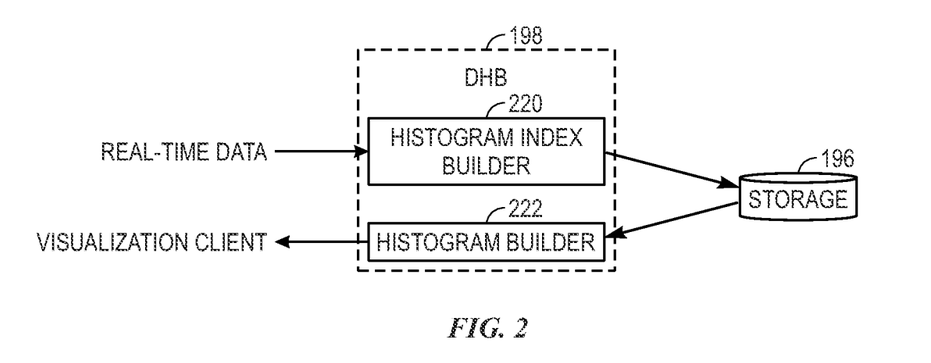
FIG. 2 is a block diagram of an example dynamic histogram builder (DHB), in accordance with an embodiment of the present disclosure.

FIG. 2 is a block diagram of an example dynamic histogram builder 198, in accordance with an embodiment of the present disclosure. As shown, the dynamic histogram builder 198 includes a histogram index builder 220 and a histogram builder 222. The histogram index builder 220 is coupled to the data stream reader 192 and the storage 196. The histogram index builder 220 receives the input data stream from the data stream reader 192. As discussed above, the histogram index builder 220 generates a number of histogram indices for the input data stream for various time intervals (e.g., minute, hour, day, etc.). The histogram index builder 220 provides and stores the histogram indices in the storage 196.

The histogram builder 222 is coupled to the visualization client 200 and the storage 196. In operation, the histogram builder 222 receives a time period for the histogram to be displayed. The histogram builder 222 may also receive a bin size and/or number of bins for the histogram to be displayed. Based on the time period and the size and/or number of bins, the histogram builder 222 retrieves (e.g., obtains) one or more histogram indices from the storage 196. The histogram builder 222 may combine (e.g., map) the obtained histogram indices to generate an output histogram to be displayed via the visualization client and/or the user device.

In some embodiments, the histogram builder 222 may obtain histogram indices having a smaller time interval (e.g., minute, hour, day) than the histogram to be displayed. For example, if the bins of the histogram to be displayed correspond to a day time interval, the histogram builder may obtain histogram indices corresponding to an hour (or minute) time interval. In this way, the histogram builder 222 can quickly generate at least a portion of the histogram to be displayed for a partial time interval. For example, if the time period for the histogram includes half of a day, the histogram builder 222 can generate the portion of the histogram corresponding to the half day using the hour histogram indices, as discussed below with respect to FIGS. 3A-4B.

Figure 3A:
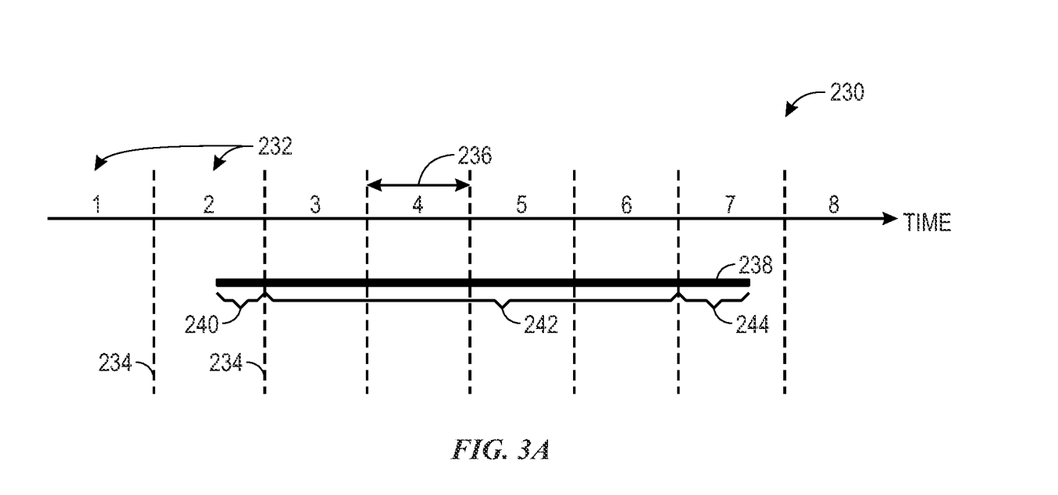
FIG. 3A is a plot illustrating a correlation between a time range of the input data stream and time bins of a corresponding histogram to be displayed, in accordance with an embodiment of the present disclosure.

FIG. 3A is a plot illustrating a correlation 230 between a time range of the input data stream and time bins of a corresponding histogram to be displayed, in accordance with an embodiment of the present disclosure. As shown, the plot includes a number of time intervals 232, each having a length 236 of, for example, one minute, one hour, one day, etc., divided by the (dashed) vertical lines 234. A line 238 corresponds to a time period for which a histogram is to be generated and displayed. The time period corresponding to the line 238 may be equivalent to a time period received by the histogram builder 222 for the histogram to be displayed. As shown, a first portion 242 of the line 238 corresponds to four whole time intervals 232 (e.g., time intervals 3-6), a second portion 240 of the line 238 corresponds to a partial time interval 232 (e.g., time interval 2), and a third portion 244 of the line 238 corresponds to a partial time interval 232 (e.g., time interval 7).

Figure 3B:
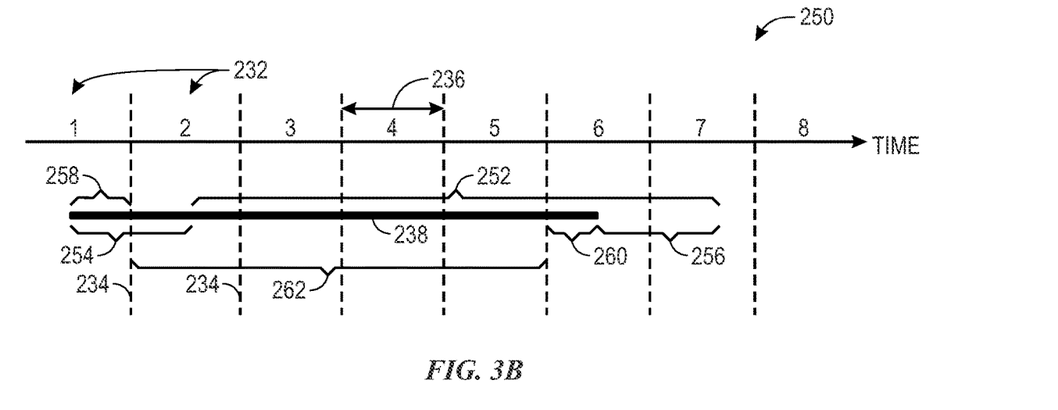
FIG. 3B illustrates an adjusted plot of FIG. 3A corresponding to a change in a time range for the histogram, in accordance with an embodiment of the present disclosure.

FIG. 3B illustrates an adjusted correlation 250 of the correlation 230 of FIG. 3A corresponding to a change in a time range for the histogram, in accordance with an embodiment of the present disclosure. As shown, a time period corresponding to the line 238 has been decreased (e.g., moved to the left). This change in the time period of the line 238 may correspond to an adjustment of the histogram being displayed. For example, the histogram may be panned (e.g., moved) to the left via the user interface. In that case, the minimum and maximum values of the time period of the histogram may be adjusted (e.g., moved to the left or decreased) by an equal amount. That is, the line 238 is shifted to the left from a previous time period 252. The previous time period 252 is the same as the time period of the line 238 illustrated in FIG. 3A. In other words, panning the histogram via the user interface may remove a portion 256 of the line 238 and add a new portion 254 of the line 238.

Once the histogram builder 222 receives the updated minimum and maximum values for the time period corresponding to the adjusted line 238 in FIG. 3B, the histogram builder 222 may determine a first portion 254 (e.g., a first time period) to be added to the histogram and a second portion 256 (e.g., a second time period) to be removed from the histogram displayed via the user interface. The histogram builder 222 may identify one or more partial time portions 258, 260 for which data is to be displayed via the histogram. The partial portions 258, 260 may be similar to the partial portions 240, 244 of FIG. 3A. That is, the histogram builder 222 may obtain histogram indices from the storage 196 for partial time portions 258, 260 using time intervals smaller than the time interval used for a middle portion of the histogram corresponding to a middle portion 262 of the line 238 between the partial portions 258, 260. For example, if the middle portion 262 corresponds to histogram indices using a time interval of days, the partial portions 258, 260 may correspond to histogram indices using a time interval of hours.

Figure 4A:
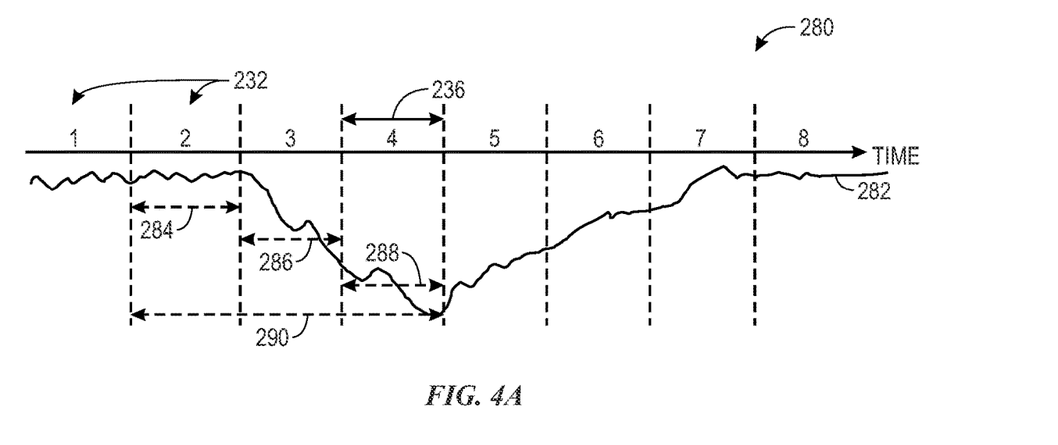
FIG. 4A is a plot of a stream of input data divided into sections representing time bins of a corresponding histogram index, in accordance with an embodiment of the present disclosure.

FIG. 4A is a plot 280 of a stream of input data 282 divided into sections representing time bins of a corresponding histogram index, in accordance with an embodiment of the present disclosure. Each section of the plot 280 corresponds to a time interval 232 of the correlations 230, 250 discussed with respect to FIGS. 3A and 3B. To generate histogram indices for various combinations of the time intervals 232, the histogram builder 222 may divide a total time of the stream of input data 282. For example, the time intervals 232 may be determined by the histogram builder 222. As discussed above, the histogram builder may use various time intervals 232 (e.g., hours, minutes, days) to generate the histogram indices.

The example discussed below provides a technique for generating histogram indices for the stream of input data 282 during a total time period 290 (e.g., during the second, third, and fourth time intervals 232). In that case, the histogram builder 222 may generate a histogram index for a second time interval 284, a third time interval 286, and a fourth time interval 288. In some embodiments, the histogram builder 222 may also generate a histogram index for the total time period 290. A length of the second time interval 284, may be the same as a length of the third time interval 286 and the fourth time interval 288. In that case, the histogram indices for the time intervals 284, 286, 288 may use the same time interval, such as minutes, hours, or days.

To generate a histogram for the total time period 290, the histogram builder 222 may obtain and use histogram indices for the time intervals 284, 286, and 288. As an example, individual histograms (e.g., histogram indices) may be generated for each time interval 284, 286, and 288. As illustrated by a plot 300 in FIG. 4B, for example, a first histogram 302 may correspond to the time interval 284, a second histogram 304 may correspond to the time interval 286, and a third histogram 306 may correspond to the time interval 288.

Figure 4B:
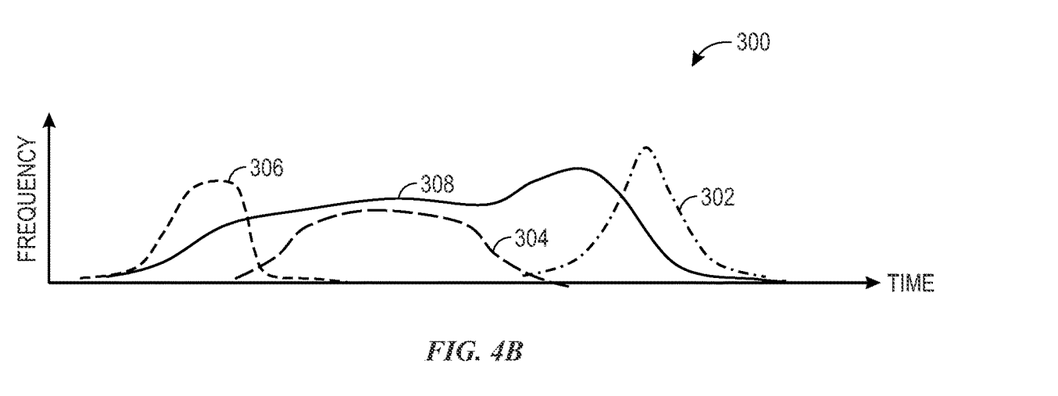
FIG. 4B is a plot of a histogram mapping of the sections of the input data of FIG. 4A, in accordance with an embodiment of the present disclosure.

The histogram builder 222 may combine the individual histograms 302, 304, 306 to generate a histogram 308 for the total time period 290. To do so, the histogram builder 222 may combine the first histogram 302 and the second histogram 304 to generate an intermediate histogram (not shown). The intermediate histogram may be combined with the third histogram 306 to generate the histogram 308 to be displayed via the user interface.

Figure 5A:
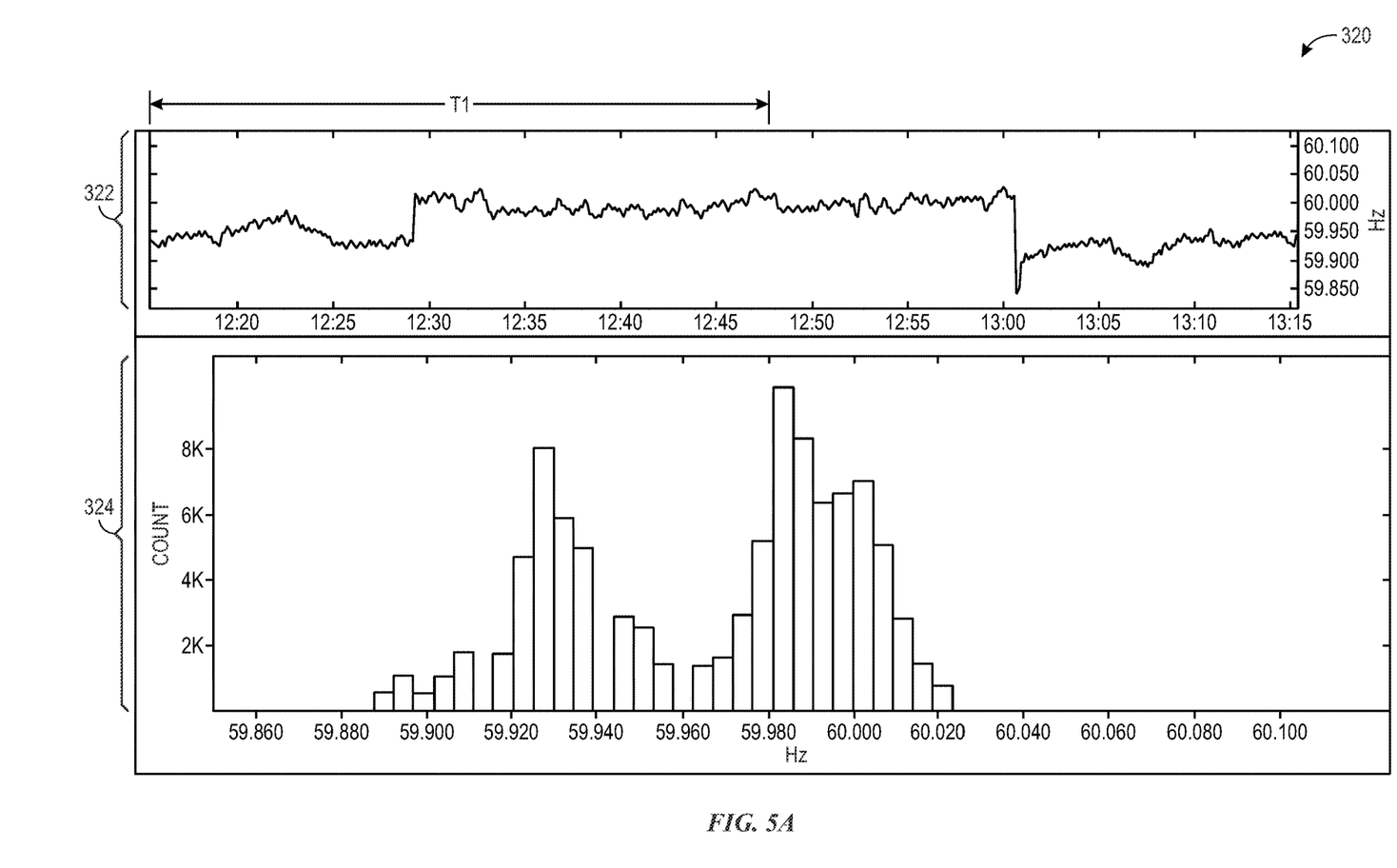
FIG. 5A illustrates an example user interface displaying a portion of the input data stream and a corresponding histogram, in accordance with an embodiment of the present disclosure.

FIG. 5A illustrates an example user interface 320 displaying a portion of the input data stream and a corresponding histogram, in accordance with an embodiment of the present disclosure. As shown, the user interface 320 includes a first section 322 and a second section 324. It should be understood that the user interface 320 may display one or both sections 322, 324 at any given time. The first section 322 displays the stream of input data for a given time period. The stream of input data corresponds to a frequency of data values received over time. The second section 324 displays a histogram corresponding to the stream of input data in the first section 322. The histogram depicts a number of bins corresponding to the frequency of the data values for the time period of the stream of input data displayed in the first section 322.

Figure 5B:
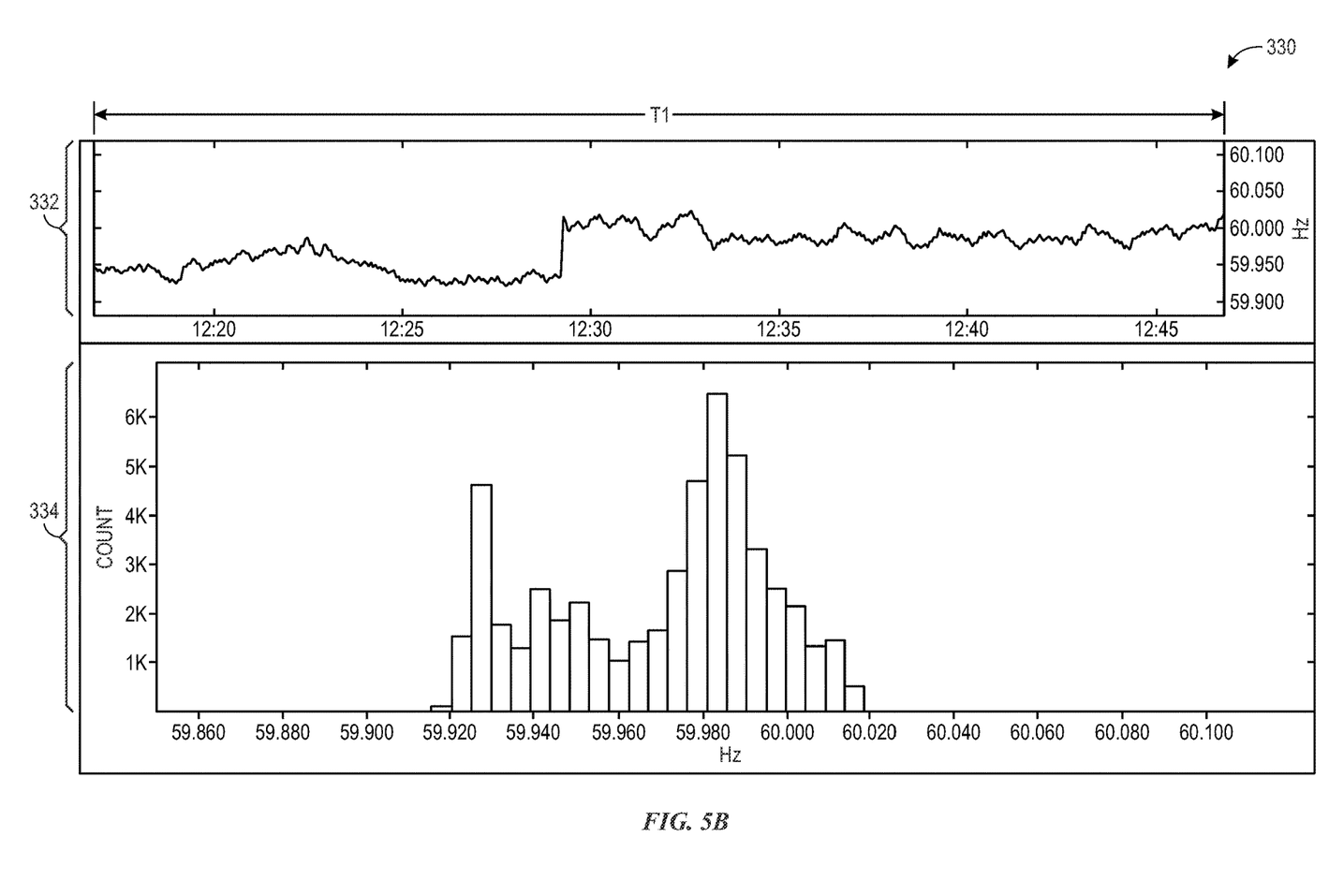
FIG. 5B illustrates the example user interface of FIG. 5A with an adjusted time period for the input data stream, in accordance with an embodiment of the present disclosure.

A time period T1 illustrates a portion of the total time period of the stream of input data depicted in the first section 322. If the total time period of the input data stream is changed (e.g., by a user viewing the user interface 320), the input data in the first section 322 and the corresponding histogram in the second section 324 may be changed. For example, the user may zoom in on the data in the input stream depicted in the first section 322 such that only the input data in the time period T1 is visible. This case is shown in FIG. 5B which illustrates the example user interface 320 of FIG. 5A. The user interface 330 of FIG. 5B illustrates that only the input data from the time period T1 is shown in the first section 332 (corresponding to the first section 322 of FIG. 5A) and the corresponding histogram for that input data is shown in the second section 334 (corresponding to the second section 324 of FIG. 5A). That is, the first section 332 of the user interface 330 of FIG. 5B shows a portion of the data stream depicted in the first section 322 of FIG. 5A. As illustrated, the histogram in the second section 334 has been updated to display the bins corresponding to the data visible in the first section 332.

By using the histogram indices obtained from storage, the dynamic histogram builder 198 may generate the updated histogram depicted in the user interface 330 of FIG. 5B without having to calculate the size of the bins based on the change in the time period of the input data in the first section 332. That is, generation of the histogram displayed in the second section 334 of the user interface 330 may not be perceptible to the user. Further, the dynamic histogram builder 198 may consume a relatively small amount of computing resources compared to a conventional histogram calculation for each view of the input data stream. Thus, the dynamic histogram builder 198 may improve an operating efficiency of the system 190 and may reduce the computing resources to generate the various views of the corresponding histogram.

Figure 6A:
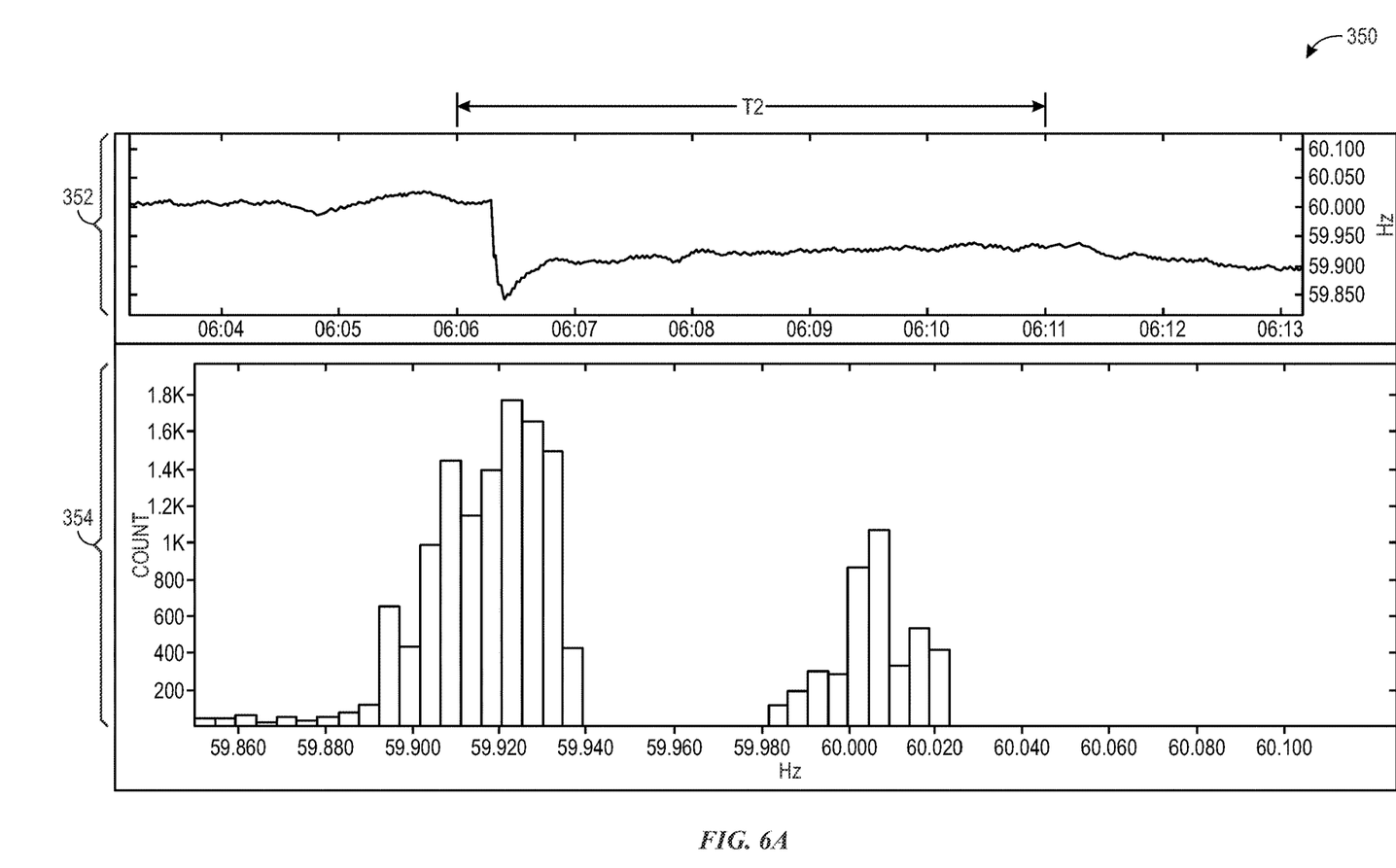
FIG. 6A illustrates the example user interface of FIG. 5A that has been panned to show the input data stream and associated histogram corresponding to a different time period, in accordance with an embodiment of the present disclosure.

FIG. 6A illustrates an example user interface 350 of FIG. 5A that has been panned to shown the input data stream and associated histogram corresponding to a different time period, in accordance with an embodiment of the present disclosure. As discussed above, a first section 352 of the user interface depicts the input data stream and a second section 354 depicts a corresponding histogram. As shown, the time period of the input data stream in the first section 352 has been shifted to an earlier time period and thus depicts different input data than the example discussed with respect to FIGS. 5A and 5B. A time period T2 illustrates an example time period to which a user of the user interface 350 can zoom into the input data stream of the first section 352.

Figure 6B:
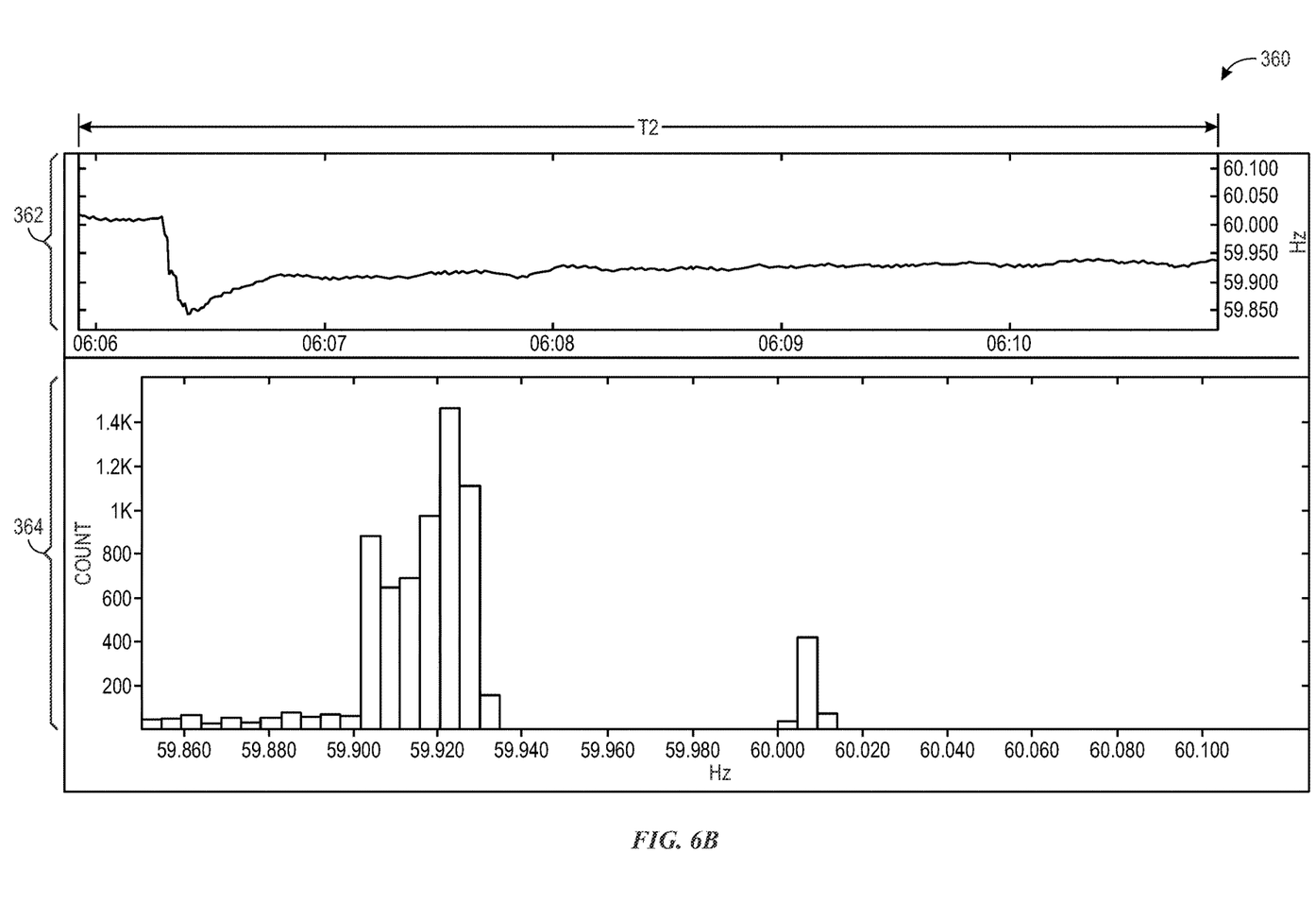
FIG. 6B illustrates the example user interface of FIG. 6A with an adjusted time period for the input data stream, in accordance with an embodiment of the present disclosure.

FIG. 6B illustrates an example user interface 360 depicting the input data stream in the first section 362 (corresponding to the first section 352 in FIG. 6A) over the time period T2. The second section 364 (corresponding to the second section 354 in FIG. 6A) of the user interface 360 depicts a histogram corresponding to the input data stream over the time period T2.

As discussed above, as the user changes the time period of the input data stream in the first section 362, the dynamic histogram builder 198 may obtain the histogram indices for the data in the first section 362 and generate a corresponding histogram to be displayed in the second section 364. This may be done without being perceptible to the user, such that the histogram is generated in near real-time with any change to the time period of the input data stream in the first section 362.

Figure 7:
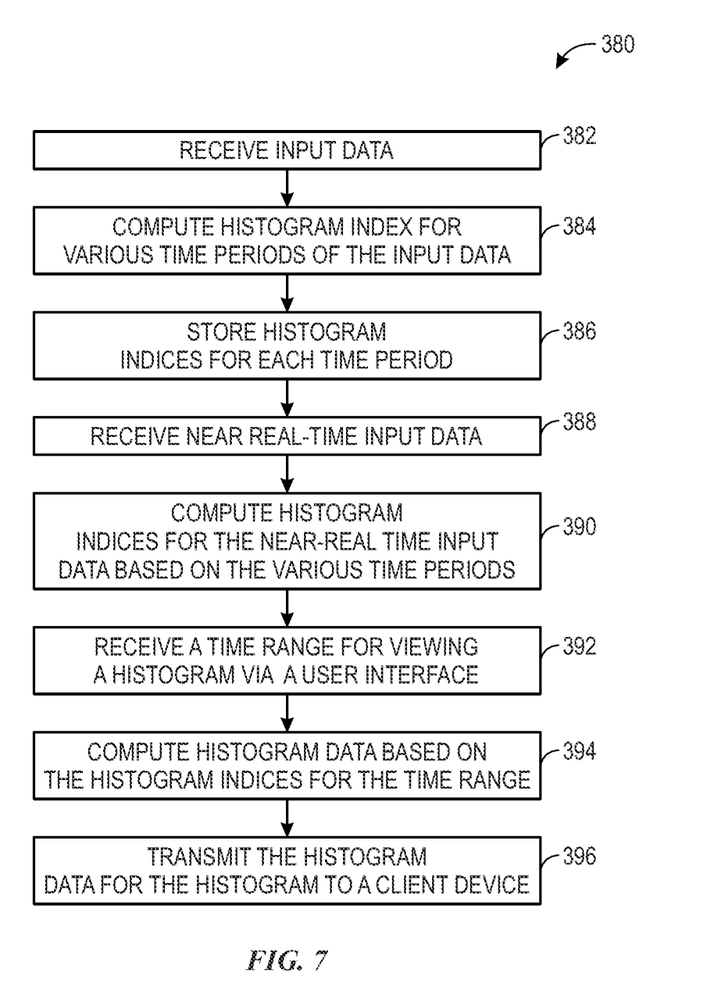
FIG. 7 is a flowchart of a process to generate an example histogram for input data, in accordance with an embodiment of the present disclosure.

FIG. 7 is a flowchart of a process 380 to generate an example histogram for an input data stream, in accordance with an embodiment of the present disclosure. The process 380 may be performed by one or more processors, such as a processor of the service platform 194 discussed with respect to FIG. 1. As shown, the process 380 begins at operation 382 where the system receives the input data stream. As discussed above, the input data stream may include any data values occurring over time. The data values may be acquired by one or more sensors implemented via hardware or software. For example, one or more physical sensors may be disposed remote from the system and monitor an input voltage and/or an output voltage of electrical equipment. The input data stream may be stored in a storage, such as the storage 196 discussed with respect to FIGS. 1 and 2.

At operation 384, a dynamic histogram builder, such as the dynamic histogram builder 198 discussed with respect to FIG. 1, computes a histogram index for various time periods of the input data received at operation 382. Each data value in the input data stream may be part of one or more histogram indices. For example, the dynamic histogram builder may generate various histogram indices for the input data using various time intervals (e.g., minutes, hours, days, etc.). Further, the dynamic histogram builder may use time intervals that overlap one another, as discussed above. Thus, a particular data value in the input data stream may be used to compute one or more histogram indices for the input data.

At operation 386, the dynamic histogram builder stores the computed histogram indices for the various time periods in storage. At operation 388, the dynamic histogram builder receives near real-time input data that is appended to the input data stream. That is, the dynamic histogram builder may continue to receive input data after and/or during the computation of the histogram indices at operation 384. At operation 390, the dynamic histogram builder computes histogram indices for the near-real time input data based on the various time periods similar to those computed at operation 384. The histogram indices for the near real-time data may be stored in the storage 196.

At operation 392, the dynamic histogram builder receives a time range for viewing a histogram via a user interface. The dynamic histogram builder may also receive various parameters for the histogram to be displayed via the user interface, such as a size and/or maximum number of bins for the histogram. At operation 394, the dynamic histogram builder computes the histogram based on the histogram indices for the time range of the user interface. That is, the dynamic histogram builder may combine one or more histogram indices to generate the histogram to be displayed. As discussed above, the histogram indices may overlap and may have the same or different time intervals (e.g., minutes, days, hours, etc.) such that the resulting histogram closely estimates the frequency of the input data stream.

At operation 396, the dynamic histogram builder transmits the data for the histogram to a client device and/or a visualization client of the system. In some embodiments, the dynamic histogram builder may transmit the individual histogram indices corresponding to the input data stream data in a first section (e.g., the first sections 322, 332, 352, 362 of FIGS. 5A-6B) of the user interface. In additional or alternative embodiments, the dynamic histogram builder may transmit histogram indices and/or data for the resulting histogram to be displayed. Advantageously, the data for the resulting histogram may consume less bandwidth than conventional techniques and thus may improve the operating efficiency of the system.

Figure 8:
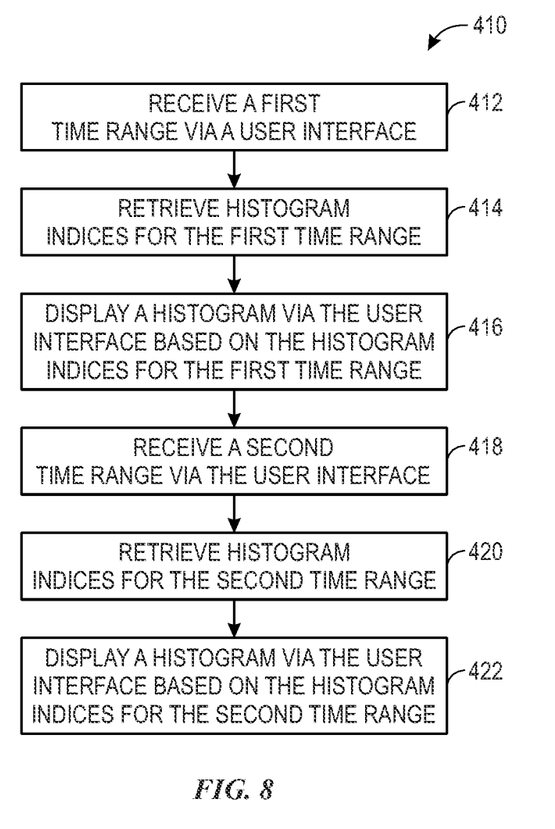
FIG. 8 is a flowchart of a process to generate a histogram for input data and modify the histogram for a changing time period, in accordance with an embodiment of the present disclosure.

FIG. 8 is a flowchart of a process 410 to generate a histogram for input data and modify the histogram for a changing time period, in accordance with an embodiment of the present disclosure. The process 410 may be performed by one or more processors, such as a processor of the service platform 194 discussed with respect to FIG. 1. The process 410 begins at operation 412, where the dynamic histogram builder receives a first time range via a user interface. The first time range may be based on a portion of the input data for which a histogram is to be computed.

At operation 414, the dynamic histogram builder retrieves histogram indices for the first time range. For example, the dynamic histogram builder may retrieve the histogram indices from storage. The histogram indices may correspond to a portion of the input data which occurred during the time range and/or a portion of the histogram to be displayed corresponding to the input data during the first time range. At operation 416, the dynamic histogram builder displays (or causes to be displayed) a histogram via the user interface based on the histogram indices for the first time range. That is, the dynamic histogram builder may generate data for the histogram to be displayed based on the retrieved histogram indices. The dynamic histogram builder may transmit the data for the histogram to a user interface to be displayed thereby.

At operation 418, the dynamic histogram builder receives a second time range via the user interface. If the second time range is the same as the first time range, the dynamic histogram builder may not take further action until a subsequent time range (or other input) associated with the histogram is received. If the second time range is different than the first time range, the dynamic histogram builder may proceed to operation 420. The second time range may be different than the first time range. That is, the second time range may be smaller than (e.g., shorter), larger than (e.g., longer), less than (e.g., occurring before), and/or greater than (e.g., occurring after) the first time range.

At operation 420, the dynamic histogram builder retrieves histogram indices for the second time range. That is, the dynamic histogram builder may retrieve histogram indices corresponding to the input data which occurred during the second time range. At operation 422, the dynamic histogram builder displays (or causes to be displayed) a histogram via the user interface based on the histogram indices for the second time range. That is, as discussed above, the dynamic histogram builder may generate data for a histogram for the second time range based on the retrieved histogram indices.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A method comprising:
receiving input data from a sensor associated with a power system, the input data collected over a time period;
computing a plurality of histogram indices for subsets of the input data, wherein each of the plurality of histogram indices comprises at least one index corresponding to a respective histogram associated with a particular subset of the subsets of the input data;
receiving a selected time period within the time period corresponding to the particular subset via a target device, the selected time period comprising a subset of the time period smaller than the time period;
determining, based on the selected time period, a plurality of time intervals associated with the selected time period, each time interval comprising a first duration;
retrieving one or more histogram indices of the plurality of histogram indices for the plurality of time intervals;
determining that the selected time period comprises one or more partial time intervals, each partial time interval comprising a second duration smaller than the first duration;
recursively computing one or more additional histogram indices corresponding to the one or more partial time intervals;
generating a histogram based on the one or more histogram indices for the plurality of time intervals and the one or more additional histogram indices for the one or more partial time intervals; and
transmitting the histogram to the target device.

2. The method of claim 1, comprising:
storing the plurality of histogram indices remote from the target device; and
transmitting a subset of the input data associated with the histogram corresponding to the selected time period to the target device.

3. The method of claim 1, comprising:
receiving an adjusted time period different from the selected time period within the time period via the target device;
retrieving one or more histogram indices of the plurality of histogram indices for the adjusted time period;
generating an adjusted histogram based on the one or more histogram indices for the adjusted time period; and
transmitting the adjusted histogram to the target device.

4. The method of claim 3, wherein each histogram index of the plurality of histogram indices are based on a length of time including at least one of minutes, hours, or days, wherein the length of time occurs within the time period.

5. The method of claim 4, wherein the one or more histogram indices of the plurality of histogram indices are based on the selected time period.

6. The method of claim 4, wherein the data for the adjusted histogram comprises one or more histograms for the length of time corresponding to one or more histogram indices of the plurality of histogram indices.

7. The method of claim 3, wherein the one or more histogram indices for the adjusted time period includes at least one histogram index of the one or more histogram indices for the selected time period.

8. The method of claim 1, wherein the input data comprises data associated with a health or safety condition, and the data associated with the health or safety condition comprises an air quality, a noise level, or both.

9. A non-transitory computer readable medium storing instructions that, when executed by a processor, cause the processor to:
receive input data collected from a sensor associated with a power system over a time period and comprising data associated with a health or safety condition;
compute a plurality of histogram indices for subsets of the input data, wherein each of the plurality of histogram indices comprises at least one index corresponding to a respective histogram associated with a particular subset of the subsets of the input data;
receive a selected time period within the time period corresponding to the particular subset via a target device, the selected time period comprising a subset of the time period smaller than the time period;
determine, based on the selected time period, a plurality of time intervals associated with the selected time period, each time interval comprising a first duration;
retrieve one or more histogram indices of the plurality of histogram indices for the selected time period;
determine that the selected time period comprises one or more partial time intervals, each partial time interval comprising a second duration smaller than the first duration;
recursively compute one or more additional histogram indices corresponding to the one or more partial time intervals;

generate a histogram based on the one or more histogram indices for the plurality of time intervals and the one or more additional histogram indices for the one or more partial time intervals; and transmit the histogram to the target device.

10. The non-transitory computer readable medium of claim 9, wherein the instructions, when executed by the processor, cause the processor to:

receive an adjusted time period within the time period via a user interface;

retrieve one or more histogram indices of the plurality of histogram indices for the adjusted time period;

generate data for an adjusted histogram based on the one or more histogram indices for the adjusted time period; and transmit the data for the adjusted histogram to be displayed via the user interface.

11. The non-transitory computer readable medium of claim 10, wherein the plurality of histogram indices are stored remote from the user interface.

12. The non-transitory computer readable medium of claim 9, wherein the input data comprises data associated with a health or safety condition, and the data associated with the health or safety condition comprises ambient temperature, weather, humidity, air pressure, brightness of light, or any combination thereof.

13. A system for dynamically generating a histogram, comprising:

a data stream reader configured to receive input data from a sensor associated with a power system over a time period;

a histogram builder coupled to the data stream reader, the histogram builder configured to:

receive a selected time period within the time period, the selected time period smaller than the time period;

determine, based on the selected time period, a plurality of time intervals associated with the selected time period, each time interval comprising a first duration;

compute a plurality of histogram indices for subsets of the input data corresponding to the plurality of time intervals;

retrieve one or more histogram indices of the plurality of histogram indices for the plurality of time intervals;

determine that the selected time period comprises one or more partial time intervals, each partial time interval comprising a second duration smaller than the first duration;

recursively compute one or more additional histogram indices corresponding to the one or more partial time intervals; and generate a histogram based on the plurality of histogram indices for the plurality of time intervals and the one or more additional histogram indices for the one or more partial time intervals, wherein each of the plurality of histogram indices comprises at least one index corresponding to a respective histogram associated with a particular subset of the subsets of the input data corresponding to the plurality of time intervals and each of the one or more additional histogram indices comprises at least one index corresponding to a respective histogram associated with a particular subset of the subsets of the input data corresponding to the one or more partial time intervals, the histogram to be presented via a user interface; and a histogram visualization client coupled to and configured to provide the histogram to the user interface.

14. The system of claim 13, wherein the histogram visualization client is configured to communicate with the user interface, and wherein the user interface is hosted remote from the histogram visualization client.

15. The system of claim 14, wherein the histogram visualization client is remote from the histogram builder.

16. The system of claim 13, wherein the time intervals include at least one of minutes, hours, or days.

17. The system of claim 13, wherein the histogram builder is configured to receive near real-time input data via the data stream reader and compute histogram indices for the near real-time input data.

18. The system of claim 13, wherein the histogram builder receives the selected time period for which the histogram is to be displayed via the user interface, and wherein the subset of the histogram indices correspond to the selected time period.

19. The system of claim 18, wherein the histogram builder receives an adjusted time period for which the histogram is to be displayed, and wherein the histogram builder generates adjusted histogram data based on a subgroup of histogram indices of the plurality of histogram indices corresponding to an adjusted histogram based on the adjusted time period.

20. The system of claim 19, wherein the subgroup of histogram indices includes at least one histogram index of the subset of histogram indices.

* * * * *